United States Patent
Cui et al.

(10) Patent No.: US 10,743,263 B2
(45) Date of Patent: Aug. 11, 2020

(54) WIRELESS COMMUNICATION SYSTEM, AND APPARATUS AND METHOD IN WIRELESS COMMUNICATION SYSTEM

(71) Applicants: SONY CORPORATION, Minato-ku, Tokyo (JP); Qimei Cui; Haowei Wang; Xiaofeng Tao; Bingshan Hu

(72) Inventors: Qimei Cui, Beijing (CN); Haowei Wang, Beijing (CN); Xiaofeng Tao, Beijing (CN); Bingshan Hu, Beijing (CN)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 16/066,224

(22) PCT Filed: Jan. 24, 2017

(86) PCT No.: PCT/CN2017/072476
§ 371 (c)(1),
(2) Date: Jun. 26, 2018

(87) PCT Pub. No.: WO2017/129112
PCT Pub. Date: Aug. 3, 2017

(65) Prior Publication Data
US 2018/0376434 A1 Dec. 27, 2018

(30) Foreign Application Priority Data
Jan. 28, 2016 (CN) .......................... 2016 1 0060087

(51) Int. Cl.
*H04W 52/36* (2009.01)
*H04W 72/14* (2009.01)
(Continued)

(52) U.S. Cl.
CPC ..... *H04W 52/365* (2013.01); *H04W 72/1289* (2013.01); *H04W 72/14* (2013.01);
(Continued)

(58) Field of Classification Search
CPC ..... H04W 52/30; H04W 72/12; H04W 72/14; H04W 16/14
See application file for complete search history.

(56) References Cited

U.S. PATENT DOCUMENTS

| 8,315,320 B2 | 11/2012 | Zhang et al. |
| 8,724,550 B2 | 5/2014 | Kone |

(Continued)

FOREIGN PATENT DOCUMENTS

| CN | 101729108 A | 6/2010 |
| CN | 101925105 A | 12/2010 |

(Continued)

OTHER PUBLICATIONS

International Search Report dated Mar. 24, 2017 in PCT/CN2017/072476 filed Jan. 24, 2017.

*Primary Examiner* — Kent Krueger
(74) *Attorney, Agent, or Firm* — Xsensus LLP

(57) ABSTRACT

A wireless communication system, an apparatus, and a method in a wireless communication system. The apparatus includes a processing circuit. The processing circuit is configured to: detect whether a pre-set power margin reporting trigger event is satisfied; and trigger, if the pre-set power margin reporting trigger event is satisfied, reporting of a power margin of a user equipment to a base station, wherein the pre-set power margin reporting trigger event includes at least one of the following events: a first event of having detected an idle channel on an unlicensed band; and a second event of having received uplink scheduling licensed signalling from the base station. A power margin in an LAA system can be effectively reported.

12 Claims, 13 Drawing Sheets

(51) Int. Cl.
*H04W 72/12* (2009.01)
*H04W 24/10* (2009.01)
*H04W 52/38* (2009.01)
*H04W 52/14* (2009.01)
*H04W 16/14* (2009.01)

(52) U.S. Cl.
CPC ............ *H04W 16/14* (2013.01); *H04W 24/10* (2013.01); *H04W 52/146* (2013.01); *H04W 52/38* (2013.01)

(56) References Cited

U.S. PATENT DOCUMENTS

| | | |
|---|---|---|
| 9,426,752 B2 | 8/2016 | Zhang et al. |
| 9,532,253 B2 | 12/2016 | Yamada et al. |
| 2010/0158147 A1 | 6/2010 | Zhang et al. |
| 2012/0207089 A1 | 8/2012 | Kone |
| 2013/0028231 A1 | 1/2013 | Zhang et al. |
| 2015/0085760 A1 | 3/2015 | Yamada et al. |
| 2016/0309426 A1 | 10/2016 | Zhang et al. |
| 2017/0013565 A1* | 1/2017 | Pelletier .............. H04W 52/146 |
| 2018/0048498 A1* | 2/2018 | Stern-Berkowitz ......................... H04L 5/0048 |
| 2018/0167823 A1* | 6/2018 | Uchino ................ H04L 5/0094 |

FOREIGN PATENT DOCUMENTS

| | | |
|---|---|---|
| CN | 102238610 A | 11/2011 |
| CN | 102318426 A | 1/2012 |

\* cited by examiner

WIRELESS COMMUNICATION SYSTEM, AND APPARATUS AND METHOD IN WIRELESS COMMUNICATION SYSTEM

The present application claims priority to a Chinese Patent Application No. 201610060087.0, titled "WIRELESS COMMUNICATION SYSTEM, AND APPARATUS AND METHOD IN WIRELESS COMMUNICATION SYSTEM" and filed on Jan. 28, 2016 with the Chinese State Intellectual Property Office, which is incorporated herein by reference in its entirety.

FIELD

The present disclosure relates to the technical field of wireless communications, and in particular to a wireless communication system and an apparatus and a method in the wireless communication system for effectively implementing Power Headroom Report (PHR) in a Licensed Assisted Access (LAA) system.

BACKGROUND

With development and evolution of wireless networks, more and more services are provided, which requires additional frequency spectrum resources to support massive data transmission. On the basis of using the existing long term evolution (LTE) network, cellular radio network operators have begun to make researches on how to use unlicensed frequency spectrum resources, such as a 5 GHz ISM (Industrial Scientific Medical) frequency band. Meanwhile, WiFi wireless industry is deploying more and more WiFi systems on unlicensed frequency bands. Since communication systems of different operators have equal rights to use the unlicensed frequency bands, it is urgent in the industry to solve the problem of how to use the same unlicensed frequency band fairly and effectively. At present, the industry generally reaches an agreement that an unlicensed frequency band should be used with the assistance of a licensed frequency band and provides services to terminals by means of carrier aggregation.

In an LTE system, user equipment (UE) reports a power headroom to a base station (eNB) through a Media Access Control (MAC) layer. The power headroom indicates a difference between a maximum transmission power of the user equipment and an estimated uplink transmission power of the user equipment and is an important basis for the base station to perform uplink scheduling and power control. Various communication systems in the LAA system have equal rights to use resources on the unlicensed frequency band, that is, a channel on the unlicensed frequency band is not always idle, and the LAA system generally has a problem of hidden nodes, which results in great interference, thus a problem to be solved in this disclosure is to effectively ensure the power headroom report of the user equipment in the LAA system.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, an object of the present disclosure is to provide a wireless communication system and an apparatus and a method in the wireless communication system for effectively implementing the power headroom report in a LAA system.

According to an aspect of the present disclosure, an apparatus in a wireless communication system is provided, which includes a processing circuit configured to detect whether a predetermined Power Headroom Report (PHR) triggering event occurs; and trigger, if the predetermined PHR triggering event occurs, to report a power headroom of user equipment to a base station, where the predetermined PHR triggering event includes at least one of a first event of detecting that a channel on an unlicensed frequency band is idle, and a second event of receiving an uplink grant signaling from the base station.

According to a preferred embodiment of the present disclosure, the predetermined power headroom report triggering event further includes a set of predefined events which include at least one of: an event that a prohibit PHR timer expires and a change in path loss since a preceding power headroom report exceeds a predetermined threshold; an event that a periodic PHR timer expires; an event that a PHR function is configured or reconfigured; an event that a secondary carrier is activated; an event that a primary carrier is added; and an event that the prohibit PHR timer expires, there are uplink resources available for new data transmission in a MAC layer and a change in power compensation value since the preceding power headroom report exceeds a predetermined threshold.

According to another preferred embodiment of the present disclosure, the processing circuit is further configured to: when it is detected that any event in the set of predefined events occurs, cancel a current triggering event if neither the first event nor the second event occurs, and trigger to report the power headroom of the user equipment to the base station if it is detected that the first event or the second event occurs.

According to another preferred embodiment of the present disclosure, the processing circuit is further configured to: when it is detected that any event in the set of predefined events occurs, if the second event does not occur, suspend a current triggering event until it is detected that the second event occurs, and then trigger to report the power headroom of the user equipment to the base station.

According to another preferred embodiment of the present disclosure, the power headroom further includes identification of an uplink grant signaling associated with the power headroom.

According to another preferred embodiment of the present disclosure, the power headroom is reported through a MAC control element, and the identification is denoted by a reserved bit or a new added bit in the MAC control element.

According to another preferred embodiment of the present disclosure, the power headroom is reported to the base station via a secondary carrier on the unlicensed frequency band.

According to another preferred embodiment of the present disclosure, the power headroom is reported to the base station by being multiplexed with a physical uplink shared channel (PUSCH).

According to another preferred embodiment of the present disclosure, the apparatus is the user equipment, and the user equipment further includes a communication unit configured to report the power headroom to the base station.

According to another aspect of the present disclosure, a wireless communication system is further provided, including: user equipment comprising a first processing circuit configured to detect whether a predetermined Power Headroom Report (PHR) triggering event occurs, and trigger, if the predetermined PHR triggering event occurs, to report a power headroom of the user equipment to a base station; and the base station comprising a second processing circuit configured to demodulate the received power headroom to be used for uplink scheduling and power control, where the predetermined power headroom report triggering event includes at least one of a first event of detecting that a channel on an unlicensed frequency band is idle, and a second event of receiving an uplink grant signaling from the base station.

According to a preferred embodiment of the present disclosure, the second processing circuit is further configured to demodulate the power headroom to determine identification of an uplink grant signaling associated with the power headroom.

According to another aspect of the present disclosure, a method in a wireless communication system is further provided, including: detecting whether a predetermined Power Headroom Report (PHR) triggering event occurs; and triggering, if the predetermined PHR triggering event occurs, to report a power headroom of user equipment to a base station, wherein the predetermined PHR triggering event comprises at least one of a first event of detecting that a channel on an unlicensed frequency band is idle, and a second event of receiving an uplink grant signaling from the base station.

According to other aspects of the present disclosure, it is further provided computer program codes and a computer program product for implementing the above method according to the present disclosure, and a computer readable storage medium on which the computer program codes for implementing the above method according to the present disclosure are recorded.

According to the embodiments of the present disclosure, it is possible to effectively implement the power headroom report of the user equipment in the LAA system.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
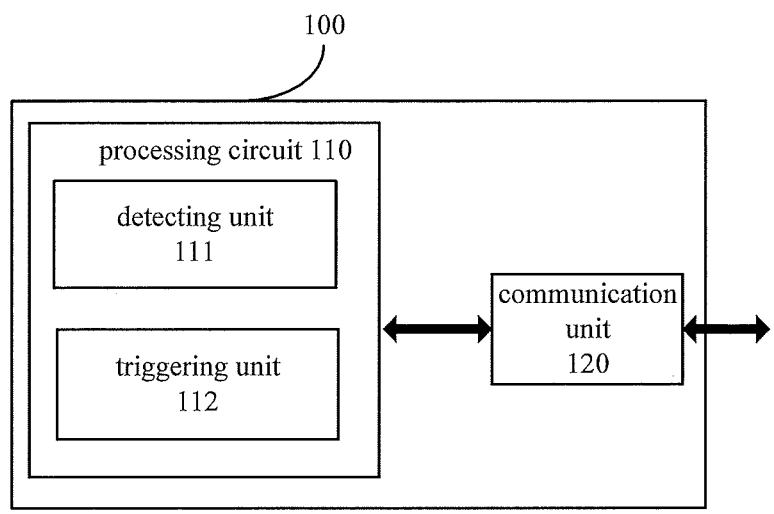
FIG. 1 is a block diagram illustrating a functional configuration example of an apparatus in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those apparatus structures and/or processing steps closely relevant to the solutions of the disclosure are illustrated in the drawings while other details less relevant to the disclosure are omitted so as not to obscure the disclosure due to those unnecessary details.

In the followings, embodiments according to the present disclosure are described in detail with reference to FIG. 1 to FIG. 17.

The present disclosure relates to an LAA communication system, in which there is a primary component carrier (PCC) operating on a licensed frequency band and one or more secondary component carriers (SCC) operating on an unlicensed frequency band, and carrier aggregation (CA) among the carriers is supported. The unlicensed frequency band may be a licensed frequency band of a non-cellular network, such as a WiFi frequency band of 2.4 GHz or 5 GHz, a television frequency band, a radar frequency band or the like. In addition, in the existing LTE standard, normally the carrier aggregation among at most five component carriers (i.e., one primary component carrier and four secondary component carriers) is supported. However, it is to be appreciated that the present disclosure is not limited thereto. With the development of the mobile communication technology, the technical solution in the present disclosure is also applicable to cases of unlicensed frequency bands with higher frequencies and the carrier aggregation among more component carriers, and is not limited to the existing modulation schemes. Also, it is to be noted that, in the conventional technology, each cell normally corresponds to a carrier at a particular frequency. For example, a primary cell (Pcell) corresponds to a primary component carrier (PCC), and a secondary cell (Scell) corresponds to a secondary component carrier (SCC). Therefore, a cell and a carrier will not be specifically distinguished in naming in the present disclosure, and those skilled in the art can understand meanings thereof. Furthermore, with the development of communication technology, there may be a communication system having only an unlicensed frequency band without assistance of a licensed frequency band, and the technical solution of the present disclosure is also applicable thereto.

Next, a functional configuration example of an apparatus in a wireless communication system according to an embodiment of the present disclosure is described first with reference to FIG. 1. FIG. 1 is a block diagram illustrating a functional configuration example of an apparatus in a wireless communication system according to an embodiment of the present disclosure.

As shown in FIG. 1, an apparatus 100 may include a processing circuit 110. It is to be noted that the apparatus 100 may include one or more processing circuits 110. The apparatus 100 is arranged on a user equipment side in a wireless communication system. Furthermore, the apparatus 100 may be the user equipment, and in this case, the apparatus 100 may further include a communication unit 120 such as a transceiver, and the like.

Further, the processing circuit 110 may include various separate functional units for performing various different functions and/or operations. It is to be noted that these functional units may be physical entities or logical entities, and units with different names may be implemented as the same physical entity.

For example, as shown in FIG. 1, the processing circuit 110 may include a detecting unit 111 and a triggering unit 112.

The detecting unit 111 may be configured to detect whether a predetermined power headroom report (PHR) triggering event occurs.

The triggering unit 112 may be configured to trigger, if the predetermined PHR triggering event occurs, to report a power headroom of user equipment to a base station.

The predetermined PHR triggering event may include at least one of a first event of detecting that a channel on an unlicensed frequency band is idle, and a second event of receiving an uplink grant signaling from the base station.

The technology of LAA supports cross-carrier scheduling and self-scheduling. For uplink cross-carrier scheduling, a scheduling carrier is located on the Pcell on a licensed frequency band; and for uplink self-scheduling, the scheduling carrier is located on the Scell on an unlicensed frequency band. Therefore, the self-scheduling includes two times of channel detection (listen-before-talk, LBT). That is, the eNB performs channel detection and transmits a UL grant if the channel is idle, and the UE performs channel detection and transmits the scheduled PUSCH if the channel is idle.

The approach for detecting whether the channel is idle may include but not limited to energy detection, i.e., detecting a signal strength, comparing the signal strength with an energy detection threshold, and determining the channel is busy if the signal strength is higher than the threshold, preamble detection, beacon detection, and acquiring information of whether the channel is idle from a database or a central manager. The approaches of energy detection, preamble detection and beacon detection are all implemented by the apparatus itself performing sensing. These approaches for detecting whether the channel is idle are well-known in the field, and are not described specifically herein.

In the case of self-scheduling, if the eNB detects the channel is busy, the UL grant cannot be transmitted, or even if the eNB successfully transmits the UL grant, the UE may be not able to demodulate the UL grant if the UE suffers from interference (due to the problem of hidden nodes, for example), and thus the UE cannot obtain a parameter for calculating the power headroom. All such matters might affect the UE normally calculating and reporting the power headroom.

In particular, two types of power headroom report (PHR) are defined. Taking type 1 as an example, the power headroom for a sub-frame i transmitting PUSCH without simultaneously transmitting PUCCH for a serving cell c is calculated by a formula of:

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\} \text{ [dB]}$$

In the formula, the parameters $M_{PUSCH,c}(i)$ and $f_c(i)$ are sent to the UE via the UL grant. That is, if the UE cannot normally receive the UL grant, the UE cannot normally calculate and report the power headroom.

Figure 2:
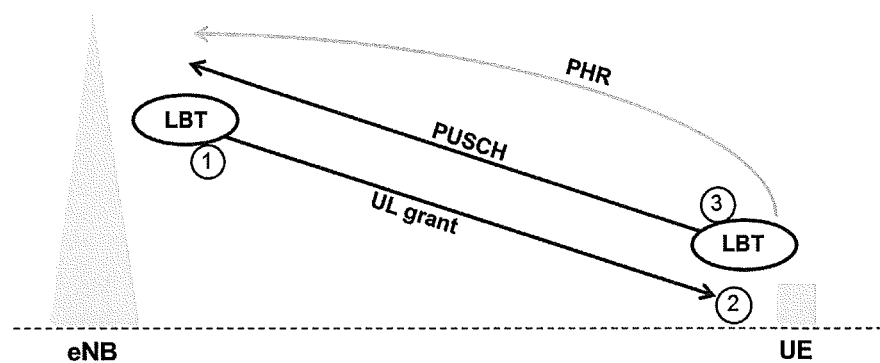
FIG. 2 is a schematic diagram illustrating examples of possible situations of power headroom report in an LAA system according to an embodiment of the present disclosure.

On the other hand, in the case of either self-scheduling or cross-carrier scheduling, for the uplink transmission in an LAA system, the UE should detect whether a channel on an unlicensed frequency band is idle before the uplink transmission. If the UE detects that the channel is busy and thus cannot transmit the scheduled PUSCH, even though the UE can report the power headroom via the Pcell in this case, the reported power headroom is meaningless, since the UE does not perform actual uplink transmission. Instead, the signaling overhead is increased. All such situations may affect the UE normally reporting the power headroom to the eNB. FIG. 2 shows examples of situations that may affect the power headroom report. FIG. 2 is a schematic diagram illustrating examples of possible situations of power headroom report in an LAA system according to an embodiment of the present disclosure.

As shown in FIG. 2, markers ①, ② and ③ respectively represent the following three situations that may affect the power headroom report.

In a first situation, in case of self-scheduling, the eNB detects that the channel is busy, and thus cannot transmit the UL grant, so that the UE cannot calculate the power headroom and report the same to the eNB in time.

In a second situation, in case of self-scheduling, the eNB detects that the channel is idle and successfully transmits the UL grant, but the UE cannot normally demodulate the UL grant due to interference from a hidden node, for example.

In a third situation, the UE detects that the channel is busy and cannot transmit the scheduled PUSCH. In this case, it is meaningless for the UE to report the power headroom, since there is no actual uplink transmission.

As can be seen, the first and second situations might occur only in the case of self-scheduling. In the case of cross-carrier scheduling, the base station transmits the UL grant to the user equipment via the Pcell, thus the problems in the first and second situations will not occur. However, the third situation might occur in both self-scheduling and cross-carrier scheduling, this is because in the LAA system, the UE transmits the scheduled PUSCH via Scell and always needs to detect whether a channel on an unlicensed frequency band is idle.

The present disclosure is made with respect to the above situations that may affect the normal report of power headroom in the LAA system, which have not been discussed yet in the conventional technology. Therefore, with respect to the power headroom report in the LAA system, in addition to the traditional power headroom report triggering events defined for the licensed frequency band in the conventional technology, a first event and a second event are newly defined in the present disclosure. The traditional power headroom report triggering events may include: an event that a prohibit PHR timer (prohibitPHR-Timer) expires and a change in path loss since a preceding power headroom report exceeds a predetermined threshold (for example, dl-PathlossChange); an event that a periodic PHR timer (periodicPHR-Timer) expires; an event that a power headroom report function is configured or reconfigured; an event that a secondary carrier is activated; an event that a primary carrier is added; and an event that the prohibitPHR-Timer expires, there are uplink resources available for new data transmission in a MAC layer and a change in power compensation value since the preceding power headroom report exceeds a predetermined threshold (for example, dl-PathlossChange).

That is, in the embodiment of the present disclosure, preferably the predetermined power headroom report triggering event may further include a set of predefined events, which may include one or more of the above traditional power headroom report triggering events.

Furthermore, it is to be understood that as described above, in an LAA system, even if the processing circuit 110 detects that any one or more traditional power headroom report triggering events occur, the UE cannot normally report the power headroom to the eNB if one or more of the above first to third situations occur. Therefore, in an embodiment of the present disclosure, preferably, when detecting that any event in the set of predefined events occurs, the processing circuit 110 may cancel the current triggering event if neither the first event nor the second event occurs, and may trigger the UE to report the power headroom to the eNB if it is detected that the first event or the second event occurs. Alternatively, when detecting that any event in the set of predefined events occurs, if the second event does not occur, the processing circuit 110 may suspend the current triggering event until it is detected that the second event occurs, and then trigger the user equipment to report the power headroom to the base station.

In the above two solutions, in the case of cancelling the current triggering event, it will continue to detect whether another event occurs, and if it is detected that another event occurs and the first or second event also occurs, the UE may be triggered to report the power headroom. This is equivalent to newly defining triggering events which are parallel with the original PHR triggering events. In the contrast, in the case of suspending the current triggering event, only the second event will be concerned and any other events are neglected, and once the second event occurs, the UE is triggered to report the power headroom. This is equivalent to adding a new action, i.e., detecting whether the second event occurs, after the original PHR triggering events.

In the following, the power headroom report in the LAA system according to the present disclosure will be respectively described in detail with respect to the above three situations.

First Situation

Figure 3A:
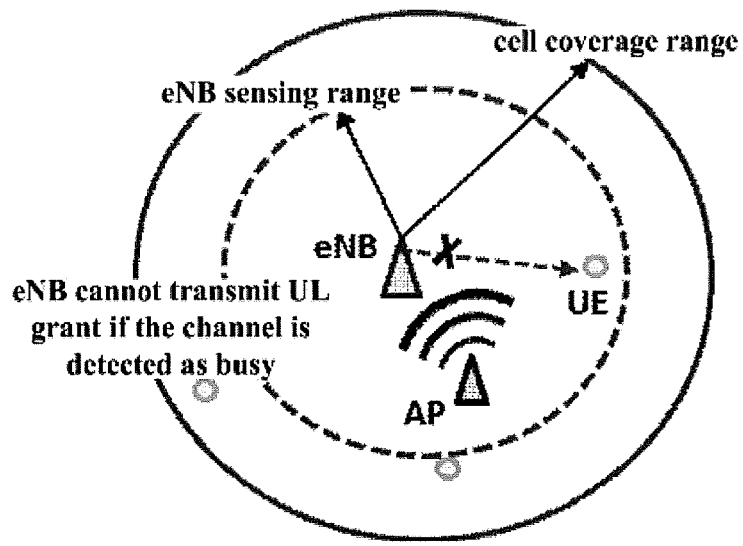
FIGS. 3A and 3B are schematic diagrams illustrating a first situation of power headroom report in an LAA system according to an embodiment of the present disclosure.
Figure 3B:
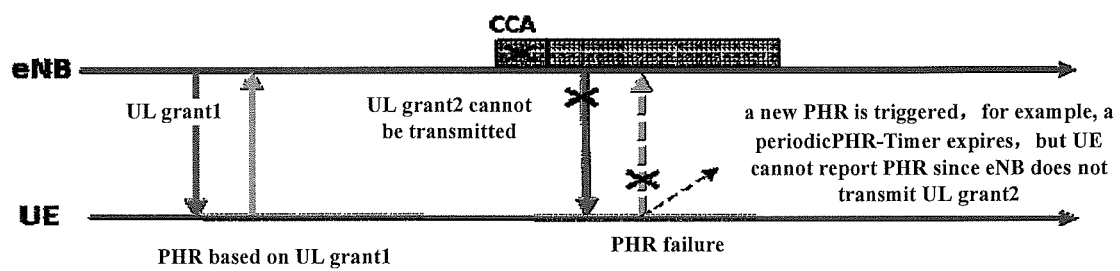

FIGS. 3A and 3B are schematic diagrams illustrating a first situation of power headroom report in an LAA system according to an embodiment of the present disclosure.

FIG. 3A shows an example of a typical arrangement of a LAA system, in which eNB denotes a base station, AP denotes a WiFi access point, and UE denotes user equipment. The eNB and the UE may communication with each other on a licensed band or an unlicensed band (such as a WiFi band).

As shown in FIG. 3A and FIG. 3B, in the case of self-scheduling, the eNB should detect whether a channel is idle before transmitting a UL grant. If the channel is idle and the eNB successfully transmits the UL grant (e.g., the UL grant1 shown in FIG. 3), then the UE may report the power headroom based on the UL grant1. The same applies to the UL grant1 and the PHR based on the UL grant1 in other figures. If the channel is busy and thus the UL grant cannot be transmitted, the UE cannot calculate the power headroom using the parameters included in the UL grant. In this case, if any of the traditional power headroom report triggering events occurs (e.g., the periodicPHR-Timer expires), but the UE cannot calculate the power headroom due to failing to receive the UL grant, for example UL grant2 in FIG. 3B, then the triggered PHR fails. With respect to this situation, two solutions are provided according the embodiments of the present disclosure.

Figure 4:
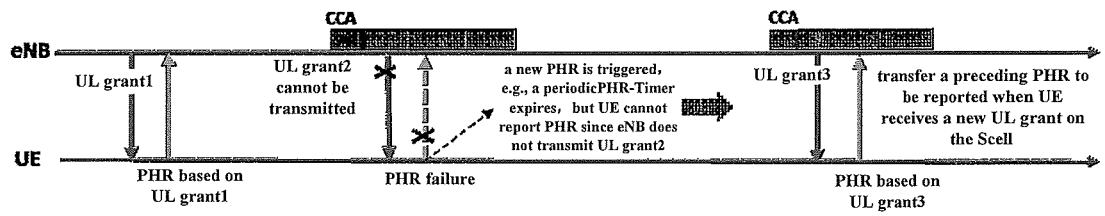
FIG. 4 is a schematic diagram illustrating an example of a first solution for the first situation according to an embodiment of the present disclosure.

FIG. 4 is schematic diagram illustrating an example of a first solution for the first situation according to an embodiment of the present disclosure.

In the first solution, if any of the traditional PHR triggering events occurs (e.g., the periodicPHR-Timer expires), but the eNB cannot transmit the UL grant because the channel is busy, and thus the UE cannot receive the UL grant, then the UE may suspend the current PHR triggering event until a new UL grant is received on the same Scell, at which time the power headroom may be reported. As can be seen, in the first solution, a subsequent action, i.e., reporting the power headroom when a new UL grant is received on the same Scell, is added after the traditional PHR triggering events. In this case, the UE may neglect any other PHR triggering evens and only concern whether a triggering event of receiving a UL grant from the eNB occurs.

As shown in FIG. 4, assuming that the power headroom report is triggered by, for example, the expiration of the periodicPHR-Timer, but the UE cannot report the power headroom because the eNB has not transmitted the UL grant 2, then the UE may suspend the current triggering event, and transfers the previously triggered PHR to be performed when receiving UL grant 3 on the same Scell from the eNB.

Taking the triggering event that the periodicPEIR-Timer expires as an example, the suspension referred here may include for example the following two cases.

(1) When the triggering event that the periodicPHR-Timer expires occurs, a timer maintained by the UE counts backwards to "0". Then the timer of the UE keeps at "0" because no new UL grant has been received. The UE reports the power headroom when receiving a new UL grant on the Scell, and then the timer starts a next round of counting according to the conventional protocol so as to perform corresponding power headroom report.

(2) When the triggering event that the periodicPHR-Timer expires occurs, the timer maintained by the UE counts backwards to "20", for example. However, the UE determines that eNB should have transmitted the UL grant according to the transmission format (such as DSUUUD-SUUU), but fails to detect any downlink data, which indicates the channel is detected as busy and thus no UL grant is transmitted on the eNB side. Moreover, the eNB cannot detect the channel again to transmit the UL grant in the following maximum channel occupation time (MCOT), while the timer on the UE side will count to "0" in the MCOT. In this case, the UE may directly pause the timer at "20" until the UE receives a new UL grant on the Scell. Then the timer continues to count backwards from "20", and the PHR is performed based on the latest UL grant when the timer counts to "0".

Two exemplary implementations in the case of "suspending" the current triggering event are given above. Those skilled in the art may obviously devise other specific implementations of the "suspending" operation according to actual requirements, and all of these specific implementations also fall within the protection scope of the present disclosure.

Figure 5:
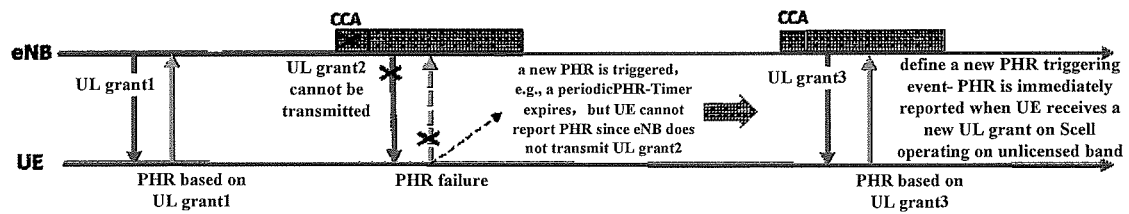
FIG. 5 is a schematic diagram illustrating an example of a second solution for the first situation according to an embodiment of the present disclosure.

FIG. 5 is a schematic diagram illustrating an example of a second solution for the first situation according to an embodiment of the present disclosure.

In the second solution, if any of the traditional PHR triggering events occurs (e.g., the periodicPHR-Timer expires), the eNB cannot transmit the UL grant due to the busy channel, and thus the UE cannot receive the UL grant, then the UE may cancel the current PHR triggering event, and report the power headroom when receiving a new UL grant on the same Scell. As can be seen, in the second solution, a new PHR triggering event is defined, i.e., receiving a new UL grant on the Scell. The new PHR triggering event is parallel to the traditional PHR triggering events in the conventional protocol. That is, when any of the triggering events occurs, the UE may be triggered to report the power headroom.

As shown in FIG. 5, assuming that the power headroom report is triggered by, for example, the expiration of the periodicPHR-Timer, but the UE cannot report the power headroom because the eNB does not transmit the UL grant 2. In this case, the UE cancels the current triggering event, and reports the power headroom when the newly defined PHR triggering event occurs, i.e., a new UL grant is received on the Scell.

Two solutions for the situation that the eNB may not transmit a UL grant due to the busy channel in the case of self-scheduling are provided above, so as to effectively realize the PHR.

Second Situation

Figure 6A:
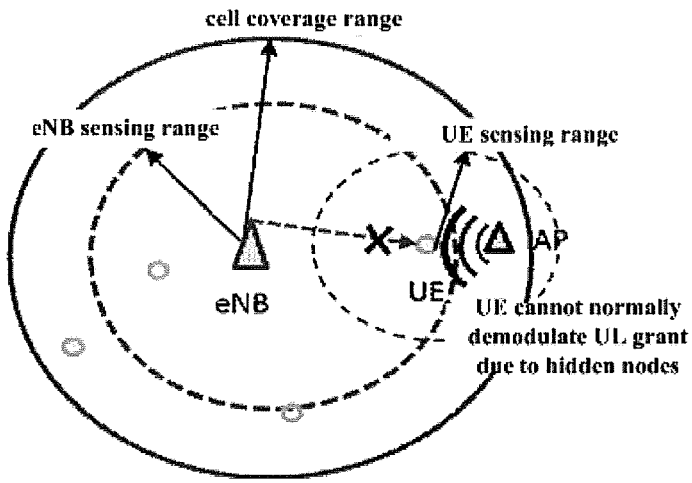
FIGS. 6A and 6B are schematic diagrams illustrating a second situation of power headroom report in an LAA system according to an embodiment of the present disclosure.
Figure 6B:
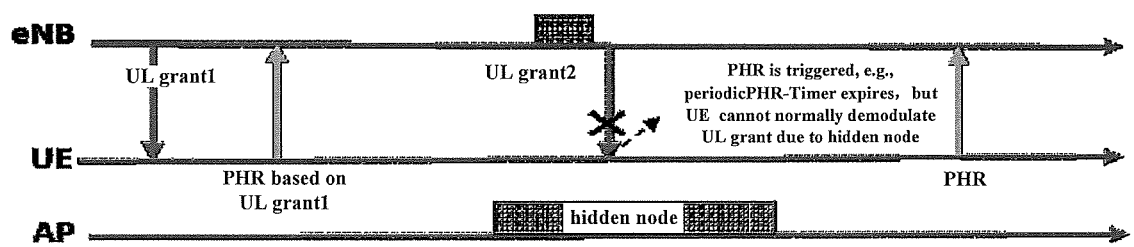

FIGS. 6A and 6B are schematic diagrams illustrating a second situation of power headroom report in an LAA system according to an embodiment of the present disclosure.

As shown in FIGS. 6A and 6B, in the case of self-scheduling, assuming a WiFi access point (WiFi AP), which is not in the sensing range of the eNB but in the sensing range of the UE, is located in vicinity of the UE, thus the eNB detects that the channel is idle and transmits the UL grant to the UE. However, the UE may not normally demodulate the UL grant because of the hidden node (i.e., the WiFi AP). This is because the channel may be not idle for the UE which suffers from great interference from the AP. In this case, the UL grant is transmitted by the eNB but cannot be demodulated by the UE. If a PHR triggering event (such as the event that the periodicPHR-Timer expires) occurs at this time, a problem might occur in the power headroom report, because the UE cannot demodulate the latest UL grant.

Normally, the eNB believes the power headroom reported by the UE is calculated based on the latest UL grant. However, in the above case, since the UE cannot demodulate the latest UL grant, the reported power headroom may be calculated based on a previously modulated UL grant. If this is not notified to the eNB, it may affect subsequent operations such as uplink scheduling and power control performed by the eNB.

Figure 7:
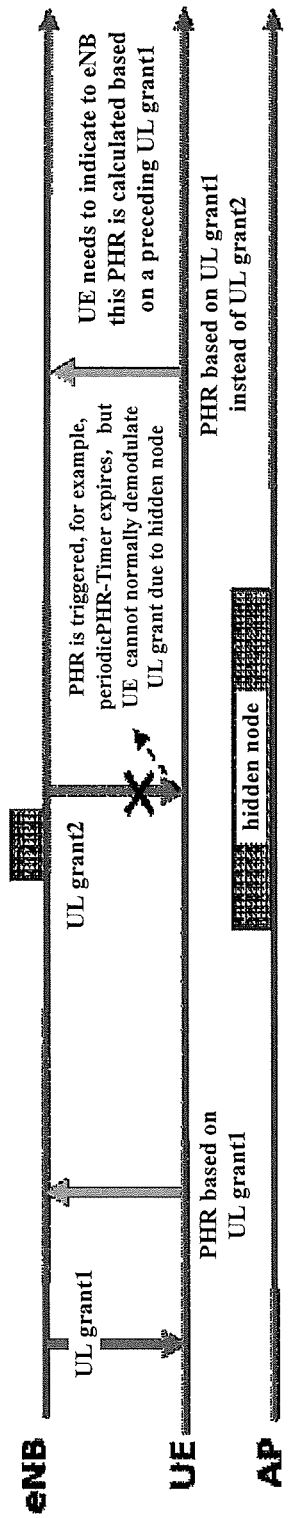
FIG. 7 is a schematic diagram illustrating an example of a solution for the second situation according to an embodiment of the present disclosure.

To solve the problem in the power headroom report in the above case, it is proposed in the present disclosure that the UE may report a power headroom together with identification, e.g., ID, of the UL grant associated with the power headroom to the eNB, so as to notify the eNB of the UL grant based on which the reported PHR is calculated. FIG. 7 shows a solution for the second situation. FIG. 7 is a schematic diagram illustrating an example of a solution for the second situation according to an embodiment of the present disclosure.

As shown in FIG. 7, in a case that a PHR triggering event, such as the event that the periodicTimer expires, occurs, if the UE cannot demodulate the UL grant2 transmitted by the eNB at this time due to the hidden node, the UE indicates, while reporting the power headroom to the eNB, that the power headroom is calculated based on the preceding UL grant1.

Preferably, the power headroom is reported through a MAC control element, and the identification of the UL grant associated with the power headroom may be represented by a reserved bit or a new bit in the MAC control element. For example, in the existing protocol, the PHR has 3 formats, namely a format used in the case of a single serving cell, a format used in the case of multiple serving cells in carrier aggregation, and a format used in the case of dual connection. In all the three formats, there are two reserved bits ("R") for each serving cell, which may be used to represent the UL grant based on which the PHR is calculated. The eNB may determine the UL grant based on which the PHR is calculated by demodulating the PHR reported by the UE. In this way, by using the reserved bits in the conventional signaling format, compatibility with the existing standard is maintained and the signaling overhead is not increased. Alternatively, with the development of the mobile communication technology, the PHR may carry more information and thus a new bit may be added to the PHR format. The new bit may also be used to notify the identification of the UL grant.

It is to be noted that, although an exemplary method for notifying the eNB of the identification of the UL grant associated with the reported power headroom, those skilled in the art may choose other methods according to actual requirements, which will not be limited herein.

Third Situation

Figure 8A:
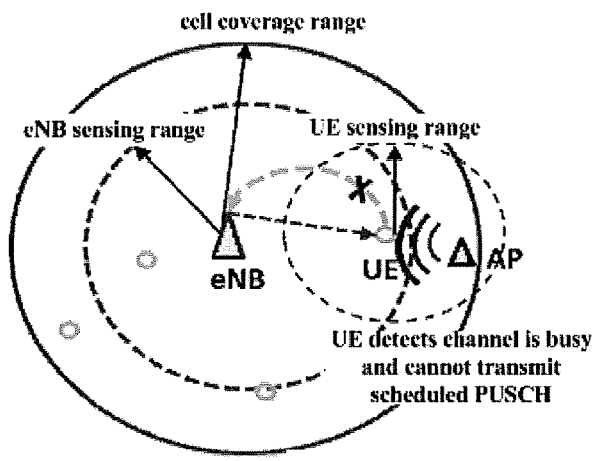
FIGS. 8A and 8B are schematic diagrams illustrating a third situation of power headroom report in an LAA system according to an embodiment of the present disclosure.
Figure 8B:
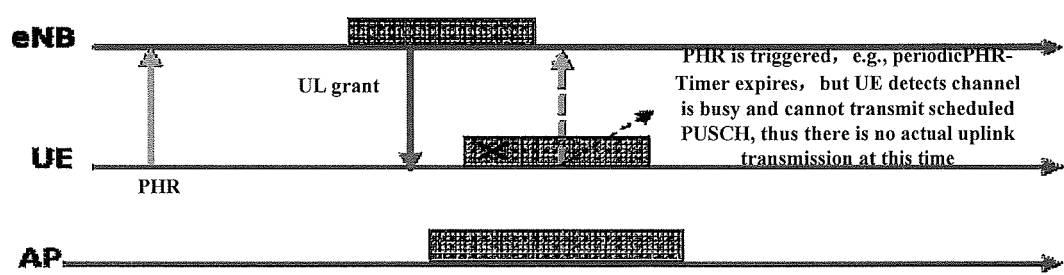

FIG. 8A and FIG. 8B are schematic diagrams illustrating a third situation of power headroom report according to an embodiment of the present disclosure.

Different from the above two situations, in the case of either self-scheduling or cross-carrier scheduling, uplink transmission of UE in the LAA system is performed through the Scell, thus the UE should always detect the channel before performing the uplink transmission in the LAA system. If the channel is busy, the UE cannot transmit the scheduled PUSCH. If a PHR triggering event (such as the event that the periodicPHR-Timer expires) occurs at this time, the reporting of PHR by the UE is meaningless because there is no actual uplink transmission, resulting in waste of signaling overhead, as shown in FIG. 8A and FIG. 8B.

With respect to this situation, in order to reduce signaling overhead, the present disclosure provides a solution of canceling the current PHR triggering event, and newly defining a PHR triggering event (i.e., an event that a channel on the unlicensed frequency band is detected as idle). The new PHR triggering event is parallel with the traditional PHR triggering events in the conventional protocol. That is, the UE may be triggered to report power headroom when any of the triggering events occurs.

Figure 9:
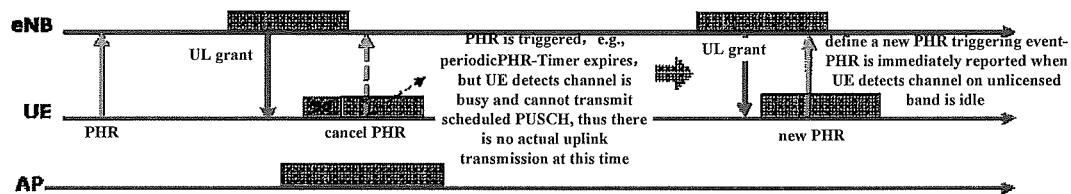
FIG. 9 is a schematic diagram illustrating an example of a solution for the third situation according to an embodiment of the present disclosure.

FIG. 9 is a schematic diagram illustrating an example of a solution for the third situation according to an embodiment of the present disclosure. As shown in FIG. 9, it is assumed that the power headroom report is triggered by, for example, the expiration of the periodicPHR-Timer, but the UE detects the channel is busy and thus cannot transmit the scheduled PUSCH at this time, that is, there is no actual uplink transmission currently, thus the UE cancels the current triggering event, and reports the power headroom when the newly defined PHR triggering event (i.e., an event that a channel on the unlicensed frequency band is detected as idle) occurs.

As can be seen from above, the solution shown in FIG. 9 is similar to the second solution for the first situation described with reference to FIG. 5, only differing in that the solution as shown in FIG. 5 is only applicable to the situation that may occur in the case of self-scheduling, while the solution as shown in FIG. 9 is applicable to the situation in the cases of both self-scheduling and cross-carrier scheduling.

It should be noted that, when reporting the power headroom to the eNB via the communication unit 120 of the apparatus 100, the power headroom may be reported to the eNB through the Pcell as in the conventional technology. However, as described above, the technology in the present disclosure may be applied to a system using only the unlicensed frequency band, and in this case, the power headroom may be reported to the eNB through the Scell by being multiplexed with PUSCH.

Also, it should be noted that, although three possible situations of PHR in the LAA system are described respectively, one or more of the three situations may occur at the same time in practice. Therefore, those skilled in the art may combine the above solutions according to the principles in the present disclosure to solve the problem in the corresponding situation, and all of such combinations should be considered to fall within the scope of the present disclosure.

Figure 10:
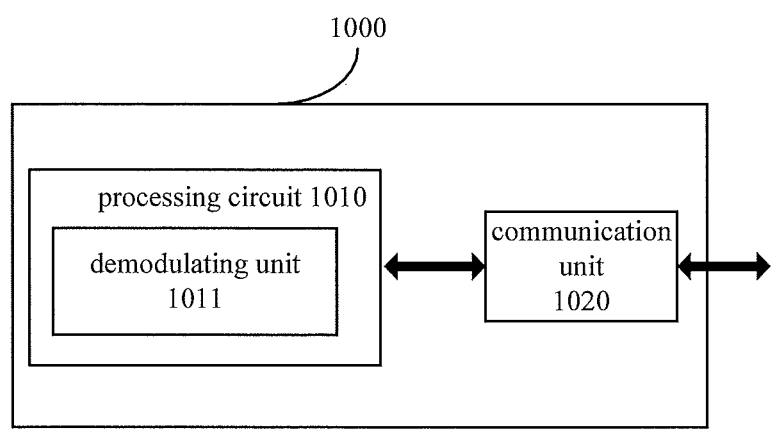
FIG. 10 is a block diagram illustrating a functional configuration example of an apparatus in a wireless communication system according to an embodiment of the present disclosure.

Next, an apparatus on a base station side in a wireless communication system is described with reference to FIG. 10. FIG. 10 is a block diagram illustrating a functional configuration example of an apparatus in a wireless communication system according to an embodiment of the present disclosure.

As shown in FIG. 10, an apparatus 1000 may include a processing circuit 1010. It is to be noted that the apparatus 1000 may include one or more processing circuits 1010. Furthermore, the apparatus 1000 may be a base station, in which case the apparatus 1000 may further include a communication unit 1020 such as a transceiver.

As described above, the processing circuit 1010 may likewise include various separate functional units for performing various different functions and/or operations. These functional units may be physical entities or logical entities, and units with different names may be implemented as the same physical entity.

As shown in FIG. 10, the processing circuit 1010 may include a demodulating unit 1011, which may be configured to demodulate the received power headroom to be used for uplink scheduling and power control.

Preferably, the demodulating unit 1011 may be further configured to demodulate the power headroom to determine identification of an uplink grant signaling associated with the power headroom. As described above, in order to solve the problem of power headroom report in the case that the eNB has transmitted the UL grant but the UE cannot demodulate the UL grant, the UE may report the identification of the UL grant together with the power headroom to the eNB, so that the eNB may know, by demodulating the received power headroom, the UL grant based on which the currently received power headroom is calculated, so as to assist the uplink scheduling and power control.

In addition, in the case of self-scheduling, the processing circuit 1010 may be further configured to detect whether a channel is idle, for example, by means of energy detection, before transmitting the UL grant, and transmit the UL grant only if the channel is idle.

The communication unit 1020 may be configured to transmit the UL grant to the UE and receive the power headroom report (PHR) from the UE.

It is to be understood that, the functional configuration example on the base station side described here corresponds to the above described functional configuration example on the user equipment side, thus the contents which are not described in detail herein may be referred to the above description at corresponding positions, and are not repeated herein.

Furthermore, it is to be noted that, although the functional configuration examples of the apparatuses on the user equipment side and the base station side are described with reference to the specific embodiments, it is to be understood that these are only examples rather than limitations. Those skilled in the art may modify the above functional configurations according to the principle of the present disclosure, for example, add, combine and/or delete functional units or the like, and all of such variations should be also considered to fall within the scope of the present disclosure.

Figure 11:
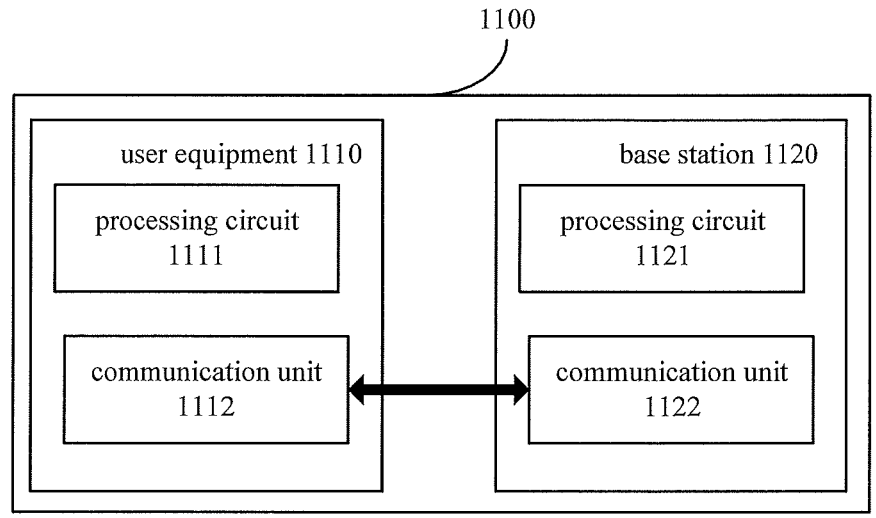
FIG. 11 is a block diagram illustrating a configuration example of a wireless communication system according to an embodiment of the present disclosure.

Next, a wireless communication system 1100 according to an embodiment of the present disclosure is described. FIG. 11 is a block diagram illustrating a configuration example of a wireless communication system according to an embodiment of the present disclosure.

As shown in FIG. 11, the wireless communication system 1100 may include user equipment 1110 and a base station 1120. The user equipment 1110 may include a processing circuit 1111, and the base station 1120 may include a processing circuit 1121. Optionally, the user equipment 1110 may further include a communication unit 1112, and the base station 1120 may further include a communication unit 1122.

It is to be noted that, the user equipment 1110 has the same configuration as the user equipment 100 described above with reference to FIG. 1, and the base station 1120 has the same configuration as the base station 1000 described above with reference to FIG. 10, thus the details thereof are not repeated herein.

Figure 12:
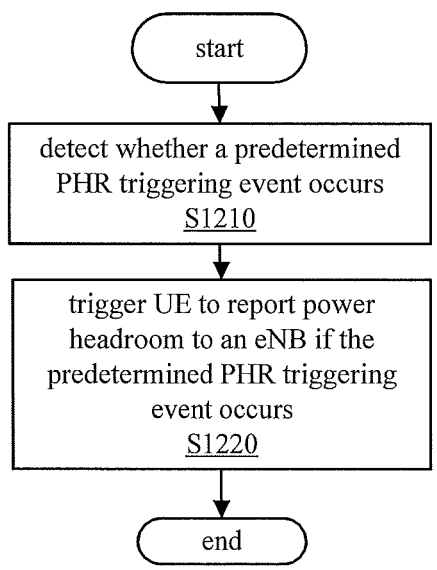
FIG. 12 is a flowchart illustrating a process example of a method in a wireless communication system according to an embodiment of the present disclosure.

Next, a process example of a method performed on the user equipment side is described with reference to FIG. 12. FIG. 12 is a flowchart illustrating a process example of a method in a wireless communication system according to an embodiment of the present disclosure.

As shown in FIG. 12, the method according to the embodiment starts at step S1210. In step S1210, it is detected whether a predetermined power headroom report triggering event occurs. Then the method proceeds to step S1220, in which the user equipment is triggered to report the power headroom to a base station, if it is detected in S1210 that the predetermined power headroom report triggering event occurs.

Preferably, the predetermined power headroom report triggering event includes at least one of a first event of detecting that a channel on an unlicensed frequency band is idle, and a second event of receiving an uplink grant signaling from the base station.

Preferably, the predetermined power headroom report triggering event may further include a set of predefined events which include at least one of: an event that a prohibit PHR timer expires and a change in path loss since a preceding power headroom report exceeds a predetermined threshold; an event that a periodic PHR timer expires; an event that a PHR function is configured or reconfigured; an event that a secondary carrier is activated; an event that a primary carrier is added; and an event that the prohibit PHR timer expires, there are uplink resources available for new data transmission in a MAC layer and a change in power compensation value since the preceding power headroom report exceeds a predetermined threshold.

Preferably, the method may further include: when it is detected that any event in the set of predefined events occurs, cancel a current triggering event if neither the first event nor the second event occurs, and trigger to report the power headroom of the user equipment to the base station if it is detected that the first event or the second event occurs.

Preferably, the method may further include: when it is detected that any event in the set of predefined events occurs, if the second event does not occur, suspend a current triggering event until it is detected that the second event occurs, and then trigger to report the power headroom of the user equipment to the base station.

Preferably, the power headroom may further include identification of an uplink grant signaling associated with the power headroom.

Preferably, the power headroom is reported through a MAC control element, and the identification is denoted by a reserved bit or a new added bit in the MAC control element.

Preferably, the power headroom is reported to the base station via a secondary carrier on the unlicensed frequency band.

Preferably, the power headroom is reported to the base station by being multiplexed with a physical uplink shared channel.

It is to be noted that, the method described herein corresponds to the apparatus embodiment described above with reference to FIG. 1, thus contents which are not described in detail in the method embodiment here can be referred to the above corresponding description in the embodiment of the corresponding apparatus on the user equipment side, and are not repeated here.

Although a process example of the method in the wireless communication system according to the embodiments of the present disclosure has been described above, it should be understood that this is merely an example but not limitation, and the above embodiment can be modified by those skilled in the art in accordance with the principles of the present disclosure. For example, steps in the embodiment may be added, deleted or combined or the like, and all of such modifications are considered to fall within the scope of the present disclosure.

It should be understood that machine-executable instructions in a storage medium and a program product according to the embodiments of the present disclosure may be also configured to execute the method corresponding to the apparatus embodiments described above, thus contents which are not described in detail may be referred to foregoing description at corresponding positions, and are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Figure 13:
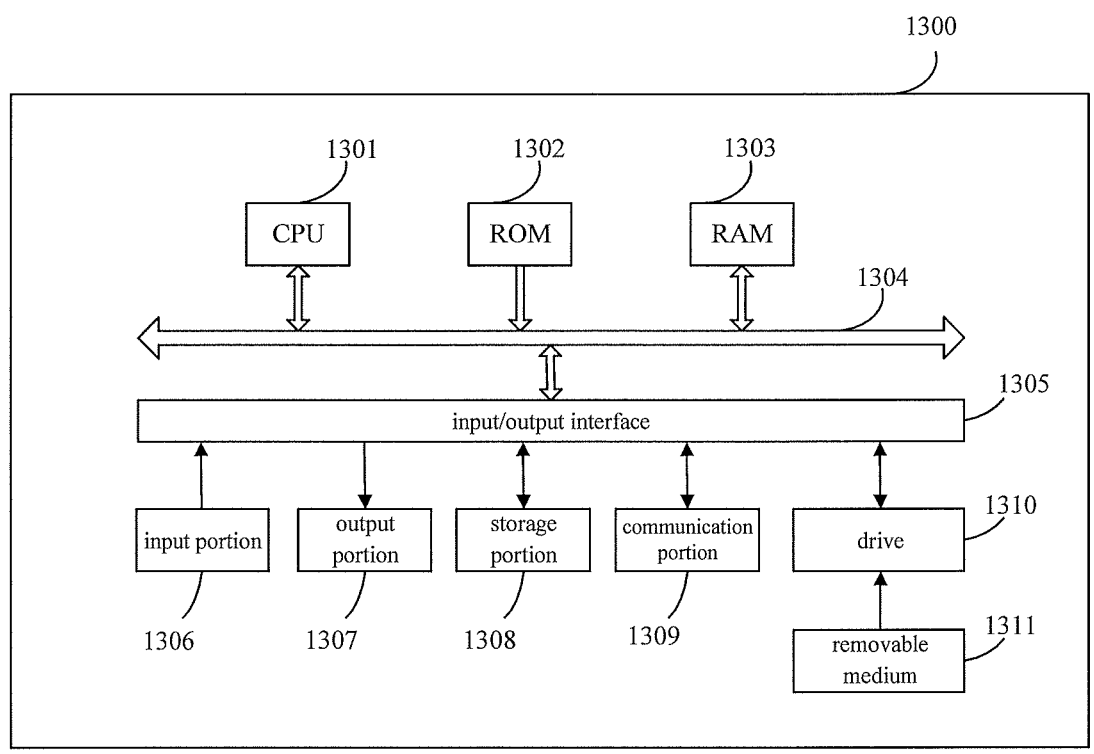
FIG. 13 is a block diagram illustrating an exemplary structure of a personal computer that may be adopted as an information processing device in an embodiment of the present disclosure.

Furthermore, it shall be noted that the foregoing series of processing and apparatus can also be embodied in software and/or firmware. In the case of being embodied in software and/or firmware, a program constituting the software is installed from a storage medium or a network to a computer with a dedicated hardware structure, e.g., a general purpose personal computer 1300 illustrated in FIG. 13, which can perform various functions when various programs are installed thereon. FIG. 13 is a block diagram illustrating an exemplary structure of a personal computer that may be adopted as an information processing device in an embodiment of the present disclosure.

In FIG. 13, a Central Processing Unit (CPU) 1301 performs various processes according to a program stored in a Read Only Memory (ROM) 1302 or loaded from a storage portion 1308 into a Random Access Memory (RAM) 1303 in which data required when the CPU 1301 performs the various processes is also stored as needed.

The CPU 1301, the ROM 1302 and the RANI 1303 are connected to each other via a bus 1304 to which an input/output interface 1305 is also connected.

The following components are connected to the input/output interface 1305: an input portion 1306 including a keyboard, a mouse, etc.; an output portion 1307 including a display, e.g., a Cathode Ray Tube (CRT), a Liquid Crystal Display (LCD), etc., a speaker, etc.; a storage portion 1308 including a hard disk, etc.; and a communication portion 1309 including a network interface card, e.g., an LAN card, a modem, etc. The communication portion 1309 performs a communication process over a network, e.g., the Internet.

A drive 1310 is also connected to the input/output interface 1305 as needed. A removable medium 1311, e.g., a magnetic disk, an optical disk, a magneto optical disk, a semiconductor memory, etc., can be installed on the drive 1310 as needed so that a computer program fetched therefrom can be installed into the storage portion 1308 as needed.

In the case that the foregoing series of processing are performed in software, a program constituting the software is installed from a network, e.g., the Internet, etc., or a storage medium, e.g., the removable medium 1311, etc.

Those skilled in the art shall appreciate that such a storage medium will not be limited to the removable medium 1311 illustrated in FIG. 13 in which the program is stored and which is distributed separately from the apparatus to provide a user with the program. Examples of the removable medium 1311 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1302, a hard disk included in the storage portion 1308, etc., in which the program is stored and which is distributed together with the apparatus including the same to the user.

The technology in the present disclosure may be applied in various productions. For example, the base station in the present disclosure may be implemented as an evolved node B (eNB) of any type, such as a macro eNB and a small eNB. The small eNB may be an eNB which covers a cell smaller than a macro cell, such as a pico eNB, a micro eNB and a home (femto) eNB. Alternatively, the base station may be implemented as any other type of base station, such as a Node B and a base transceiver station (BTS). The base station may include: a main body (also referred to as base station device) configured to control the wireless communication, and one or more remote radio heads (RRH) provided at a different site from the main body. Further, various types of terminal devices to be described below may function as a base station by performing the function of the base station temporarily or semi-permanently.

For example, the UE in the present disclosure may be implemented as a mobile terminal (such as smart phone, a panel personal computer (PC), a notebook PC, a portable game terminal, a portable/dongle mobile router and a digital camera) or an on-board terminal device (such as car navigation device). The UE may also be implemented as a terminal device for performing machine to machine (M2M) communication (which is also referred to as a machine-type communication (MTC) terminal device). Further, the UE may be a wireless communication module mounted on each of the above terminals (such as integrated circuit module including a single chip).

Application examples according to the present disclosure are described below with reference to FIG. 14 to FIG. 17.

Application Example Regarding Base Station

First Application Example

Figure 14:
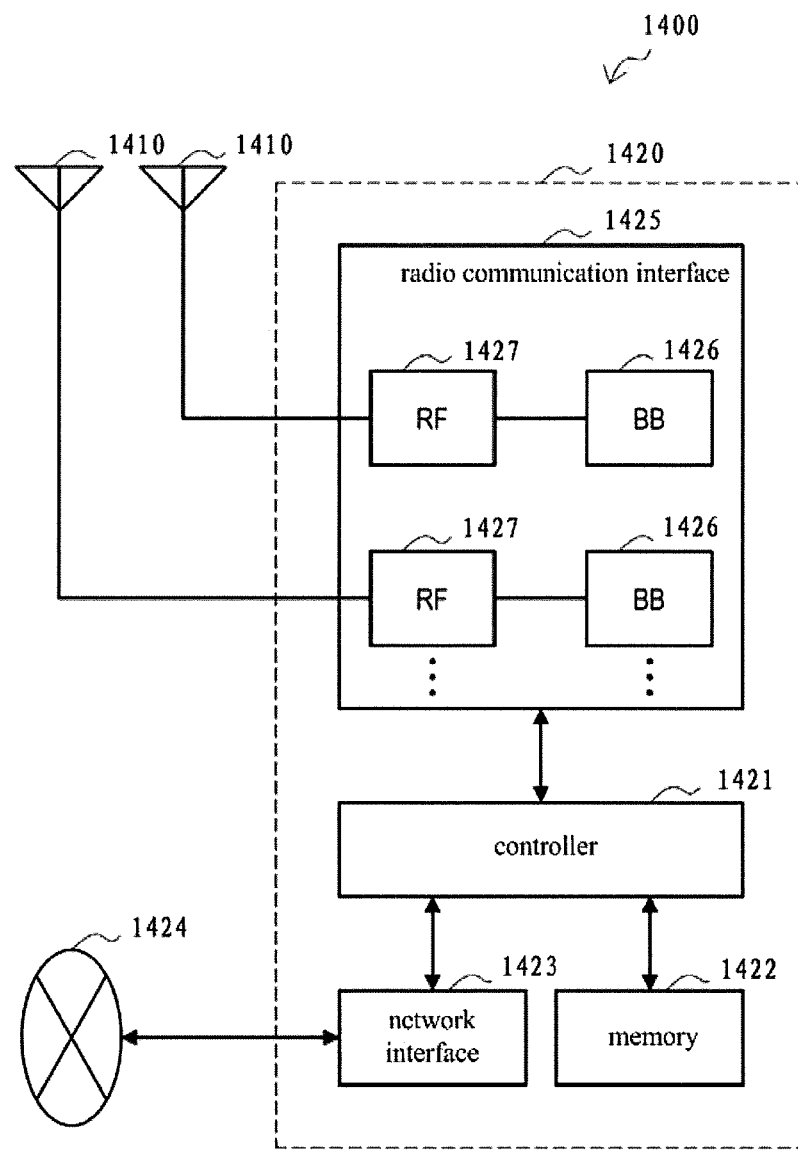
FIG. 14 is a block diagram illustrating a first example of a schematic configuration of an enhanced Node B (eNB) to which the technology according to the present disclosure can be applied.

FIG. 14 is a block diagram illustrating a first example of a schematic configuration of an eNB to which the technology of the present disclosure may be applied. An eNB 1400 includes one or more antennas 1410 and a base station apparatus 1420. Each antenna 1410 and the base station apparatus 1420 may be connected to each other via an RF cable.

Each of the antennas 1410 includes a single or multiple antenna elements (such as multiple antenna elements included in an MIMO antenna), and is used for the base station apparatus 1420 to transmit and receive radio signals. The eNB 1400 may include the multiple antennas 1410, as illustrated in FIG. 14. For example, the multiple antennas 1410 may be compatible with multiple frequency bands used by the eNB 1400. Although FIG. 14 illustrates the example in which the eNB 1400 includes the multiple antennas 1410, the eNB 1400 may also include a single antenna 1410.

The base station apparatus 1420 includes a controller 1421, a memory 1422, a network interface 1423, and a radio communication interface 1425.

The controller 1421 may be, for example, a CPU or a DSP, and operates various functions of a higher layer of the base station apparatus 1420. For example, the controller 1421 generates a data packet from data in signals processed by the radio communication interface 1425, and transfers the generated packet via the network interface 1423. The controller 1421 may bundle data from multiple base band processors to generate the bundled packet, and transfer the generated bundled packet. The controller 1421 may have logical functions of performing control such as radio resource control, radio bearer control, mobility management, admission control, and scheduling. The control may be performed in corporation with an eNB or a core network node in the vicinity. The memory 1422 includes RANI and ROM, and stores a program that is executed by the controller 1421, and various types of control data (such as a terminal list, transmission power data, and scheduling data).

The network interface 1423 is a communication interface for connecting the base station apparatus 1420 to a core network 1424. The controller 1421 may communicate with a core network node or another eNB via the network interface 1423. In that case, the eNB 1400, and the core network node or the other eNB may be connected to each other through a logical interface (such as an S1 interface and an X2 interface). The network interface 1423 may also be a wired communication interface or a radio communication interface for radio backhaul. If the network interface 1423 is a radio communication interface, the network interface 1423 may use a higher frequency band for radio communication than a frequency band used by the radio communication interface 1425.

The radio communication interface 1425 supports any cellular communication scheme such as Long Term Evolution (LTE) and LTE-Advanced, and provides radio connection to a terminal positioned in a cell of the eNB 1400 via the antenna 1410. The radio communication interface 1425 may typically include, for example, a baseband (BB) processor 1426 and an RF circuit 1427. The BB processor 1426 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1426 may have a part or all of the above-described logical functions instead of the controller 1421. The BB processor 1426 may be a memory that stores a communication control program, or a module that includes a processor and a related circuit configured to execute the program. Updating the program may allow the functions of the BB processor 1426 to be changed. The module may be a card or a blade that is inserted into a slot of the base station apparatus 1420. Alternatively, the module may also be a chip that is mounted on the card or the blade. Meanwhile, the RF circuit 1427 may include, for example, a mixer, a filter, and an amplifier, and transmits and receives radio signals via the antenna 1410.

The radio communication interface 1425 may include the multiple BB processors 1426, as illustrated in FIG. 14. For example, the multiple BB processors 1426 may be compatible with multiple frequency bands used by the eNB 1400. The radio communication interface 1425 may include the multiple RF circuits 1427, as illustrated in FIG. 14. For example, the multiple RF circuits 1427 may be compatible with multiple antenna elements. Although FIG. 14 illustrates the example in which the radio communication interface 1425 includes the multiple BB processors 1426 and the multiple RF circuits 1427, the radio communication interface 1425 may also include a single BB processor 1426 or a single RF circuit 1427.

Second Application Example

Figure 15:
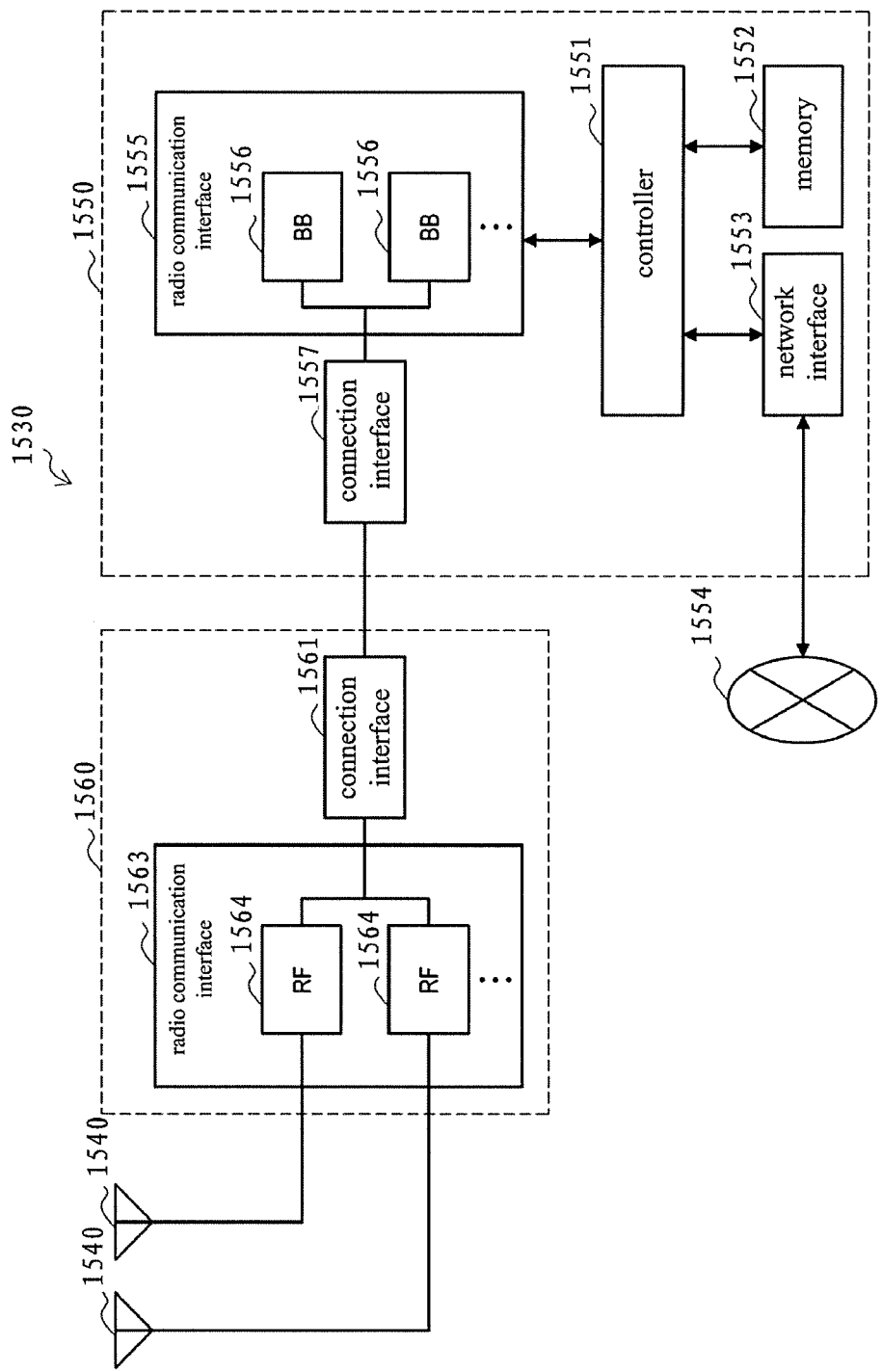
FIG. 15 is a block diagram illustrating a second example of a schematic configuration of an eNB to which the technology according to the present disclosure can be applied.

FIG. 15 is a block diagram illustrating a second example of a schematic configuration of an eNB to which the technology of the present disclosure may be applied. An eNB 1530 includes one or more antennas 1540, a base station apparatus 1550, and an RRH 1560. Each antenna 1540 and the RRH 1560 may be connected to each other via an RF cable. The base station apparatus 1550 and the RRH 1560 may be connected to each other via a high speed line such as an optical fiber cable.

Each of the antennas 1540 includes a single or multiple antenna elements (such as multiple antenna elements included in an MIMO antenna), and is used for the RRH 1560 to transmit and receive radio signals. The eNB 1530 may include the multiple antennas 1540, as illustrated in FIG. 15. For example, the multiple antennas 1540 may be compatible with multiple frequency bands used by the eNB 1530. Although FIG. 15 illustrates the example in which the eNB 1530 includes the multiple antennas 1540, the eNB 1530 may also include a single antenna 1540.

The base station apparatus 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE and LTE-Advanced), and provides radio communication to a terminal positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except the BB processor 1556 is connected to the RF circuit 1564 of the RRH 1560 via the connection interface 1557. The radio communication interface 1555 may include the multiple BB processors 1556, as illustrated in FIG. 15. For example, the multiple BB processors 1556 may be compatible with multiple frequency bands used by the eNB 1530. Although FIG. 15 illustrates the example in which the radio communication interface 1555 includes the multiple BB processors 1556, the radio communication interface 1555 may also include a single BB processor 1556.

The connection interface 1557 is an interface for connecting the base station apparatus 1550 (radio communication interface 1555) to the RRH 1560. The connection interface 1557 may also be a communication module for communication in the above-described high speed line that connects the base station apparatus 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station apparatus 1550. The connection interface 1561 may also be a communication module for communication in the above-described high speed line.

The radio communication interface 1563 transmits and receives radio signals via the antenna 1540. The radio communication interface 1563 may typically include, for example, the RF circuit 1564. The RF circuit 1564 may include, for example, a mixer, a filter, and an amplifier, and transmits and receives radio signals via the antenna 1540. The radio communication interface 1563 may include multiple RF circuits 1564, as illustrated in FIG. 15. For example, the multiple RF circuits 1564 may support multiple antenna elements. Although FIG. 15 illustrates the example in which the radio communication interface 1563 includes the multiple RF circuits 1564, the radio communication interface 1563 may also include a single RF circuit 1564.

In the eNB 1400 and eNB 1530 shown in FIG. 14 and FIG. 15, the communication unit 1020 described with reference to FIG. 10 may be implemented by the radio communication interface 1425 and the radio communication interface 1555 and/or the radio communication interface 1563. At least a part of the functions of the processing circuit 1010 may also be implemented by the controller 1421 and the controller 1551.

Application Example Regarding User Equipment

First Application Example

Figure 16:
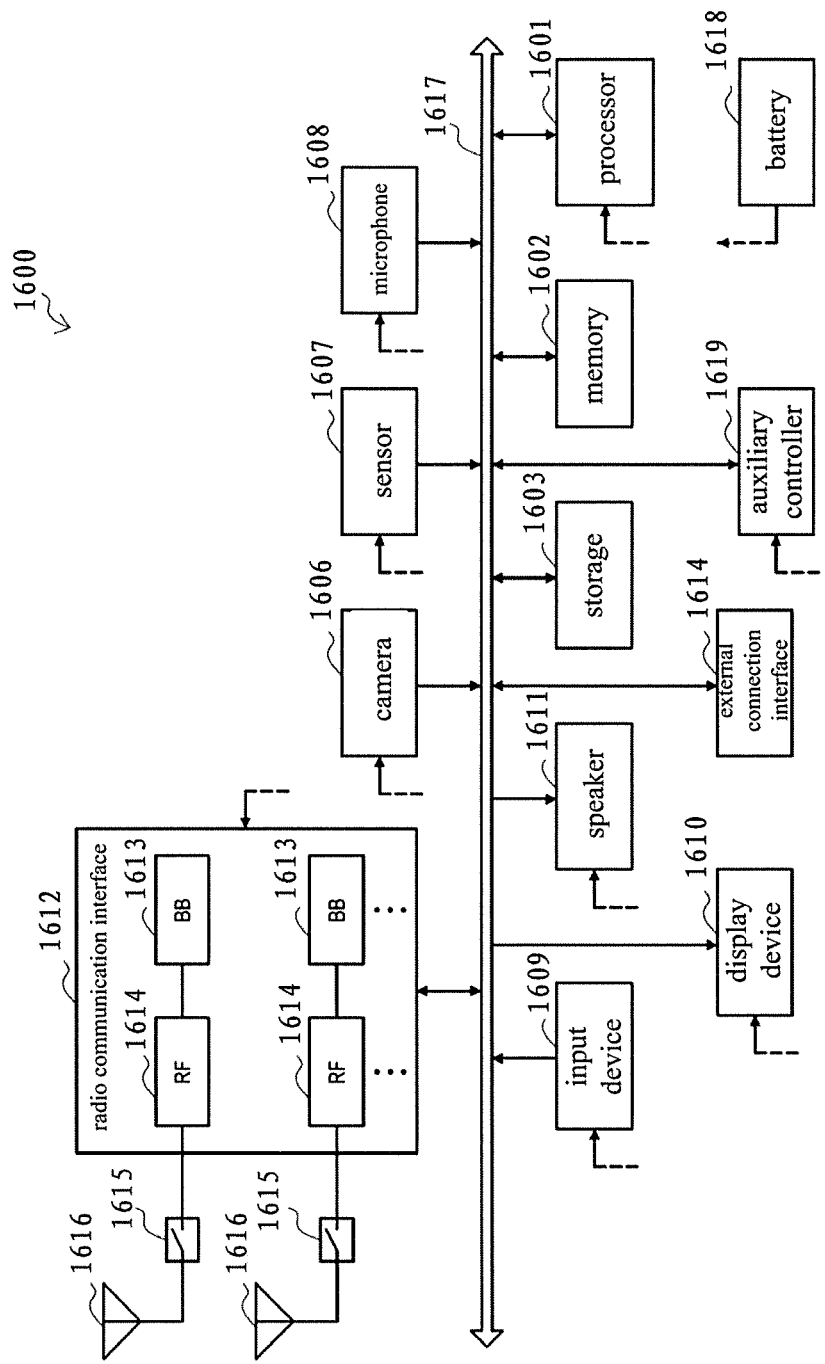
FIG. 16 is a block diagram illustrating an example of a schematic configuration of a smart phone to which the technology according to the present disclosure can be applied.

FIG. 16 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, a camera 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619.

The processor 1601 may be, for example, a CPU or a system on a chip (SoC), and controls functions of an application layer and another layer of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. The sensor 1607 may include a group of sensors such as a measurement sensor, a gyro sensor, a geomagnetic sensor, and an acceleration sensor. The microphone 1608 converts sounds that are input to the smartphone 1600 to audio signals. The input device 1609 includes, for example, a touch sensor configured to detect touch onto a screen of the display device 1610, a keypad, a keyboard, a button, or a switch, and receives an operation or an information input from a user. The display device 1610 includes a screen such as a liquid crystal display (LCD) and an organic light-emitting diode (OLED) display, and displays an output image of the smartphone 1600. The speaker 1611 converts audio signals that are output from the smartphone 1600 to sounds.

The radio communication interface 1612 supports any cellular communication scheme (such as LET and LTE-Advanced), and performs radio communication. The radio communication interface 1612 may typically include, for example, a BB processor 1613 and an RF circuit 1614. The BB processor 1613 may perform, for example, encoding/decoding, modulating/demodulating, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module having the BB processor 1613 and the RF circuit 1614 integrated thereon. The radio communication interface 1612 may include the multiple BB processors 1613 and the multiple RF circuits 1614, as illustrated in FIG. 16. Although FIG. 16 illustrates the example in which the radio communication interface 1612 includes the multiple BB processors 1613 and the multiple RF circuits 1614, the radio communication interface 1612 may also include a single BB processor 1613 or a single RF circuit 1614.

Furthermore, in addition to a cellular communication scheme, the radio communication interface 1612 may support another type of radio communication scheme such as a short-distance wireless communication scheme, a near field communication scheme, and a radio local area network (LAN) scheme. In that case, the radio communication interface 1612 may include the BB processor 1613 and the RF circuit 1614 for each radio communication scheme.

Each of the antenna switches 1615 switches connection destinations of the antennas 1616 among multiple circuits (such as circuits for different radio communication schemes) included in the radio communication interface 1612.

Each of the antennas 1616 includes a single or multiple antenna elements (such as multiple antenna elements included in an MIMO antenna), and is used for the radio communication interface 1612 to transmit and receive radio signals. The smartphone 1600 may include the multiple antennas 1616, as illustrated in FIG. 16. Although FIG. 16 illustrates the example in which the smartphone 1600 includes the multiple antennas 1616, the smartphone 1600 may also include a single antenna 1616.

Furthermore, the smartphone 1600 may include the antenna 1616 for each radio communication scheme. In that case, the antenna switches 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary controller 1619 to each other. The battery 1618 supplies power to blocks of the smartphone 1600 illustrated in FIG. 16 via feeder lines, which are partially shown as dashed lines in the figure. The auxiliary controller 1619 operates a minimum necessary function of the smartphone 1600, for example, in a sleep mode.

In the smartphone 1600 illustrated in FIG. 16, the communication unit 120 described with reference to FIG. 1 may be implemented by the radio communication interface 1612. At least a part of the functions of the processing circuit 110 may also be implemented by the processor 1601 or the auxiliary controller 1619.

Second Application Example

Figure 17:
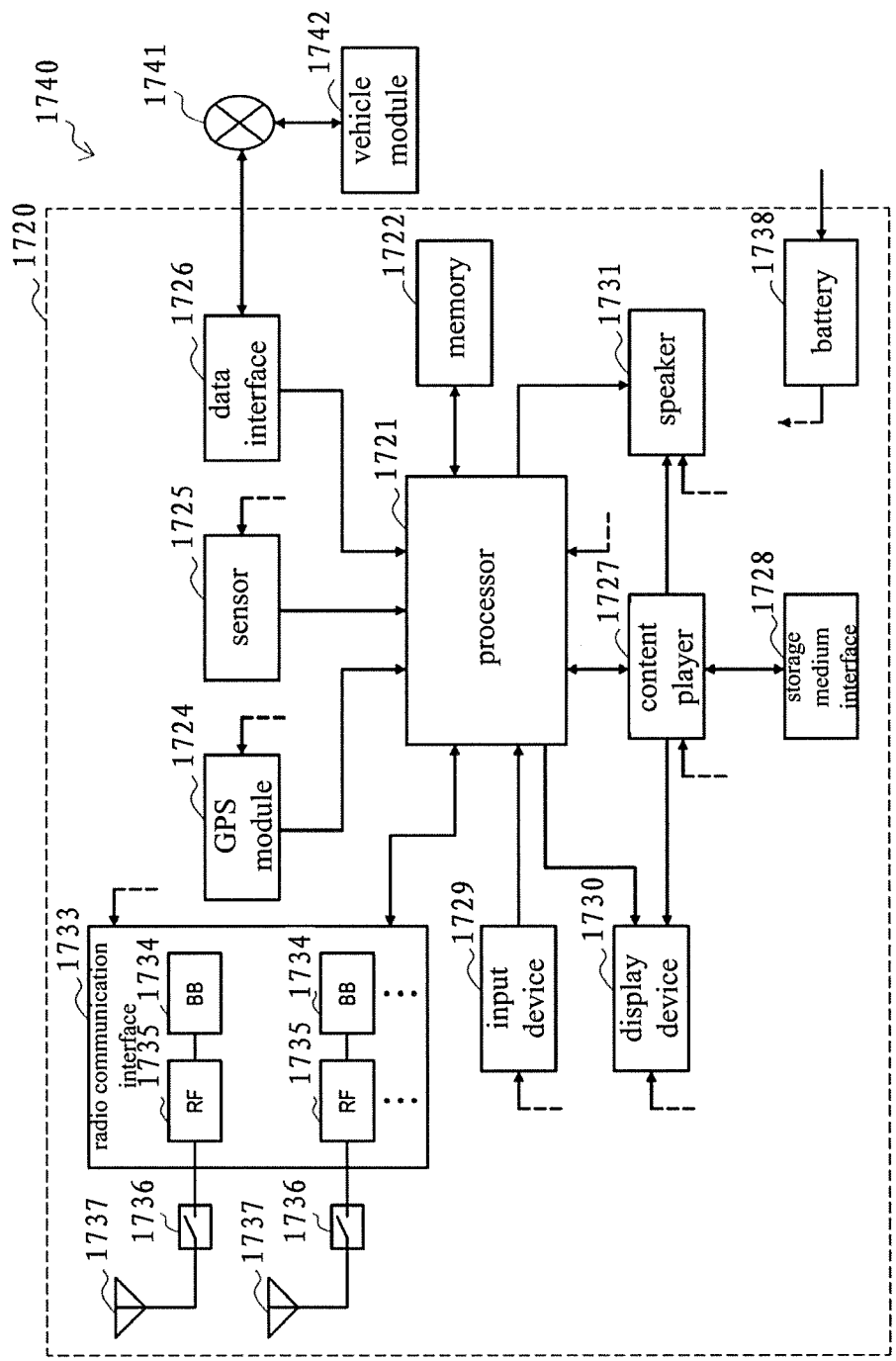
FIG. 17 is a block diagram illustrating an example of a schematic configuration of a car navigation apparatus to which the technical solution according to the present disclosure can be applied.

FIG. 17 is a block diagram illustrating an example of a schematic configuration of a car navigation apparatus 1720 to which the technology of the present disclosure may be applied. The car navigation apparatus 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a radio communication interface 1733, one or more antenna switches 1736, one or more antennas 1737, and a battery 1738.

The processor 1721 may be, for example, a CPU or a SoC, and controls a navigation function and another function of the car navigation apparatus 1720. The memory 1722 includes RAM and ROM, and stores a program that is executed by the processor 1721, and data.

The GPS module 1724 uses GPS signals received from a GPS satellite to measure a position (such as latitude, longitude, and altitude) of the car navigation apparatus 1720. The sensor 1725 may include a group of sensors such as a gyro sensor, a geomagnetic sensor, and an air pressure sensor. The data interface 1726 is connected to, for example, an in-vehicle network 1741 via a terminal that is not shown, and acquires data generated by the vehicle (such as vehicle speed data).

The content player 1727 reproduces content stored in a storage medium (such as a CD and a DVD) that is inserted into the storage medium interface 1728. The input device 1729 includes, for example, a touch sensor configured to detect touch onto a screen of the display device 1730, a button, or a switch, and receives an operation or an information input from a user. The display device 1730 includes a screen such as a LCD or an OLED display, and displays an image of the navigation function or content that is reproduced. The speaker 1731 outputs sounds of the navigation function or the content that is reproduced.

The radio communication interface 1733 supports any cellular communication scheme (such as LTE and LTE-Advanced), and performs radio communication. The radio communication interface 1733 may typically include, for example, a BB processor 1734 and an RF circuit 1735. The BB processor 1734 may perform, for example, encoding/decoding, modulating/demodulating, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module that has the BB processor 1734 and the RF circuit 1735 integrated thereon. The radio communication interface 1733 may include the multiple BB processors 1734 and the multiple RF circuits 1735, as illustrated in FIG. 17. Although FIG. 17 illustrates the example in which the radio communication interface 1733 includes the multiple BB processors 1734 and the multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-distance wireless communication scheme, a near field communication scheme, and a radio LAN scheme. In that case, the radio communication interface 1733 may include the BB processor 1734 and the RF circuit 1735 for each radio communication scheme.

Each of the antenna switches 1736 switches connection destinations of the antennas 1737 among multiple circuits (such as circuits for different radio communication schemes) included in the radio communication interface 1733.

Each of the antennas 1737 includes a single or multiple antenna elements (such as multiple antenna elements included in an MIMO antenna), and is used for the radio communication interface 1733 to transmit and receive radio signals. The car navigation apparatus 1720 may include the multiple antennas 1737, as illustrated in FIG. 17. Although FIG. 17 illustrates the example in which the car navigation apparatus 1720 includes the multiple antennas 1737, the car navigation apparatus 1720 may also include a single antenna 1737.

Furthermore, the car navigation apparatus 1720 may include the antenna 1737 for each radio communication scheme. In that case, the antenna switches 1736 may be omitted from the configuration of the car navigation apparatus 1720.

The battery 1738 supplies power to blocks of the car navigation apparatus 1720 illustrated in FIG. 17 via feeder lines that are partially shown as dashed lines in the figure. The battery 1738 accumulates power supplied form the vehicle.

In the car navigation apparatus 1720 illustrated in FIG. 17, the communication unit 120 described with reference to FIG. 1 may be implemented by the radio communication interface 1733. At least a part of the functions of the processing circuit 110 may also be implemented by the processor 1721.

The technology of the present disclosure may also be realized as an in-vehicle system (or a vehicle) 1740 including one or more blocks of the car navigation apparatus 1720, the in-vehicle network 1741, and a vehicle module 1742. The vehicle module 1742 generates vehicle data (such as vehicle speed, engine speed, and trouble information), and outputs the generated data to the in-vehicle network 1741.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. An apparatus in a wireless communication system, the apparatus comprising a processing circuit configured to:
   detect whether any one of a plurality of predetermined Power Headroom Report (PHR) triggering events occurs, wherein the plurality of predetermined PHR triggering events comprise a first event of receiving an uplink grant signaling from the base station;
   trigger, if the first event occurs, to report a power headroom of user equipment to a base station;
   detect whether the channel on the unlicensed frequency band is busy in response to one of the predetermined PHR triggering events other than the first event; and
   when detecting the channel on the unlicensed frequency band is busy, trigger to report the power headroom of the user equipment to the base station when the channel on the unlicensed frequency band becomes idle.

2. The apparatus according to claim 1, wherein the plurality of predetermined PHR triggering events further comprise a set of predefined events which comprise at least one of: an event that a prohibit PHR timer expires and a change in path loss since a preceding power headroom report exceeds a predetermined threshold; an event that a periodic PHR timer expires; an event that a PHR function is configured or reconfigured; an event that a secondary carrier is activated; an event that a primary carrier is added; and an event that the prohibit PHR timer expires, there are uplink resources available for new data transmission in a MAC layer and a change in power compensation value since the preceding power headroom report exceeds a predetermined threshold.

3. The apparatus according to claim 2, wherein the processing circuit is further configured to: when it is detected that any event in the set of predefined events occurs, cancel a current triggering event if the first event does not occur and the channel on the unlicensed frequency band is busy, and trigger to report the power headroom of the user equipment to the base station if it is detected that the first event occurs or the channel on the unlicensed frequency band is idle.

4. The apparatus according to claim 2, wherein the processing circuit is further configured to: when it is detected that any event in the set of predefined events occurs, if the the channel on the unlicensed frequency band is busy, suspend a current triggering event until it is detected that the the channel on the unlicensed frequency band is idle, and then trigger to report the power headroom of the user equipment to the base station.

5. The apparatus according to claim 1, wherein the power headroom further comprises identification of an uplink grant signaling associated with the power headroom.

6. The apparatus according to claim 5, wherein the power headroom is reported through a MAC control element, and the identification is denoted by a reserved bit or a new added bit in the MAC control element.

7. The apparatus according to claim 1, wherein the power headroom is reported to the base station via a secondary carrier on the unlicensed frequency band.

8. The apparatus according to claim 7, wherein the power headroom is reported to the base station by being multiplexed with a physical uplink shared channel.

9. The apparatus according to claim 1, wherein the apparatus is the user equipment, and the user equipment further comprises:
   a communication unit configured to report the power headroom to the base station.

10. A wireless communication system comprising:
    user equipment comprising a first processing circuit configured to:
    detect whether any one of a plurality of predetermined Power Headroom Report (PHR) triggering events occurs, wherein the plurality of predetermined PHR triggering events comprise a first event of receiving an uplink grant signaling from the base station,
    trigger, if the first event occurs, to report a power headroom of the user equipment to a base station,
    detect whether the channel on the unlicensed frequency band is busy in response to one of the predetermined PHR triggering events other than the first event; and
    when detecting the channel on the unlicensed frequency band is busy, trigger to report the power headroom of the user equipment to the base station when the channel on the unlicensed frequency band becomes idle, and
    the base station comprising a second processing circuit configured to:
    demodulate the received power headroom to be used for uplink scheduling and power control.

11. The wireless communication system according to claim 10, wherein the second processing circuit is further configured to demodulate the power headroom to determine identification of an uplink grant signaling associated with the power headroom.

12. A method in a wireless communication system, the method comprising:
    detect whether any one of a plurality of predetermined Power Headroom Report (PHR) triggering events occurs, wherein the plurality of predetermined PHR triggering events comprise a first event of receiving an uplink grant signaling from the base station;
    trigger, if the first event occurs, to report a power headroom of the user equipment to a base station;
    detect whether the channel on the unlicensed frequency band is busy in response to one of the predetermined PHR triggering events other than the first event; and
    when detecting the channel on the unlicensed frequency band is busy, trigger to report the power headroom of the user equipment to the base station when the channel on the unlicensed frequency band becomes idle.

* * * * *